Feb. 14, 1967 H. C. PERUSKI 3,303,948
HAY BALE LOADER
Filed June 4, 1965 3 Sheets-Sheet 2
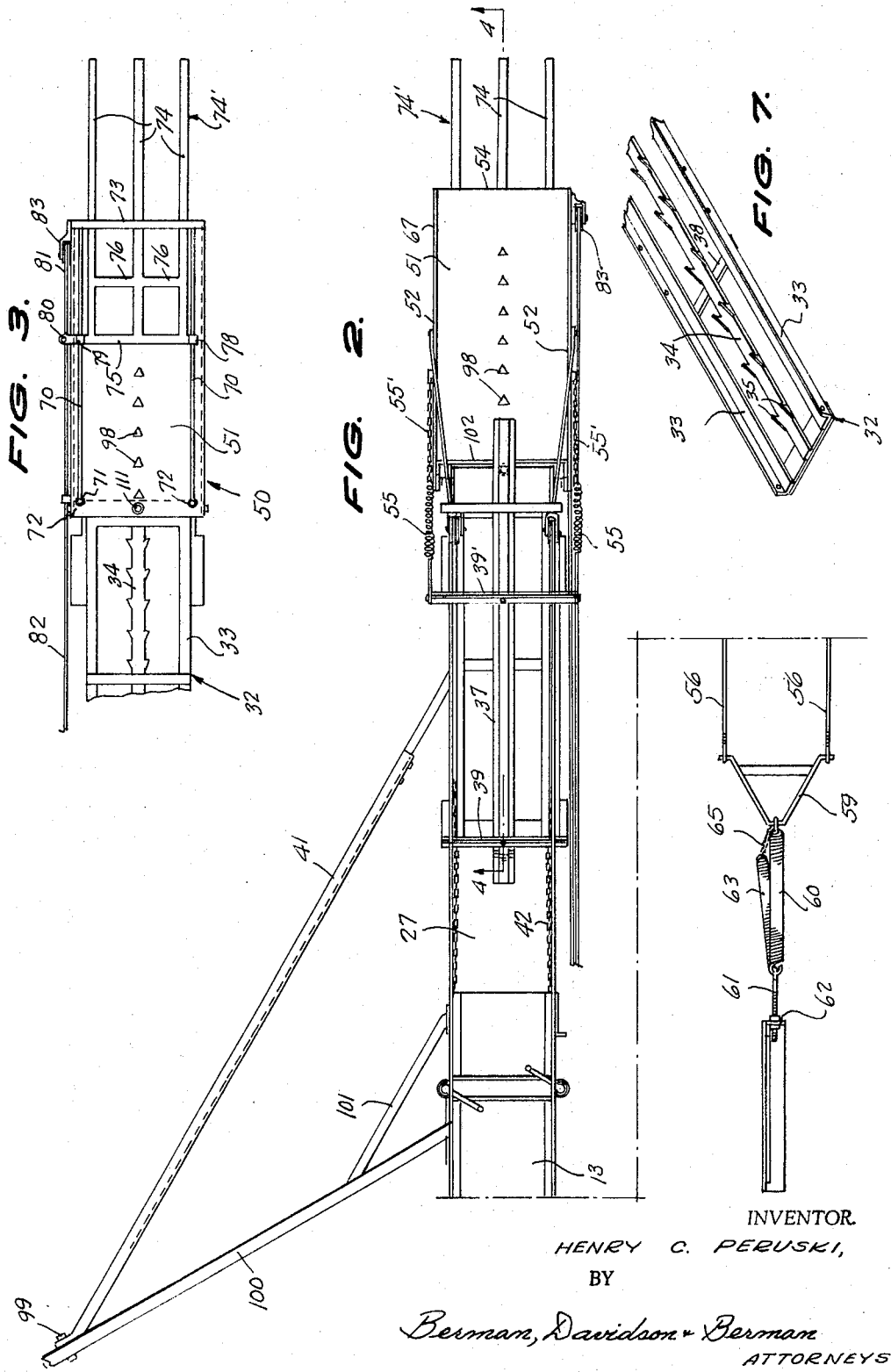
INVENTOR.
HENRY C. PERUSKI,
BY
Berman, Davidson & Berman
ATTORNEYS.

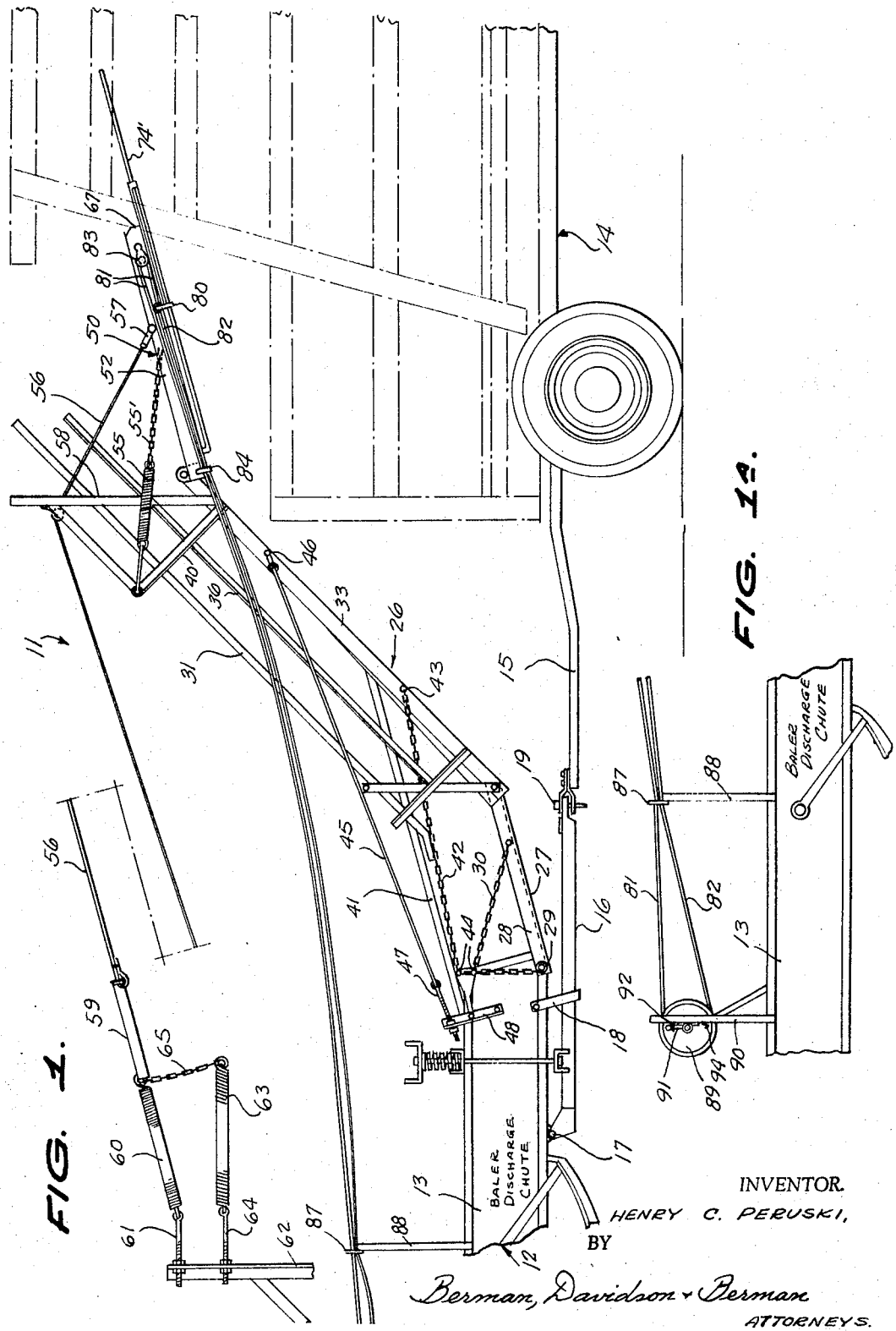

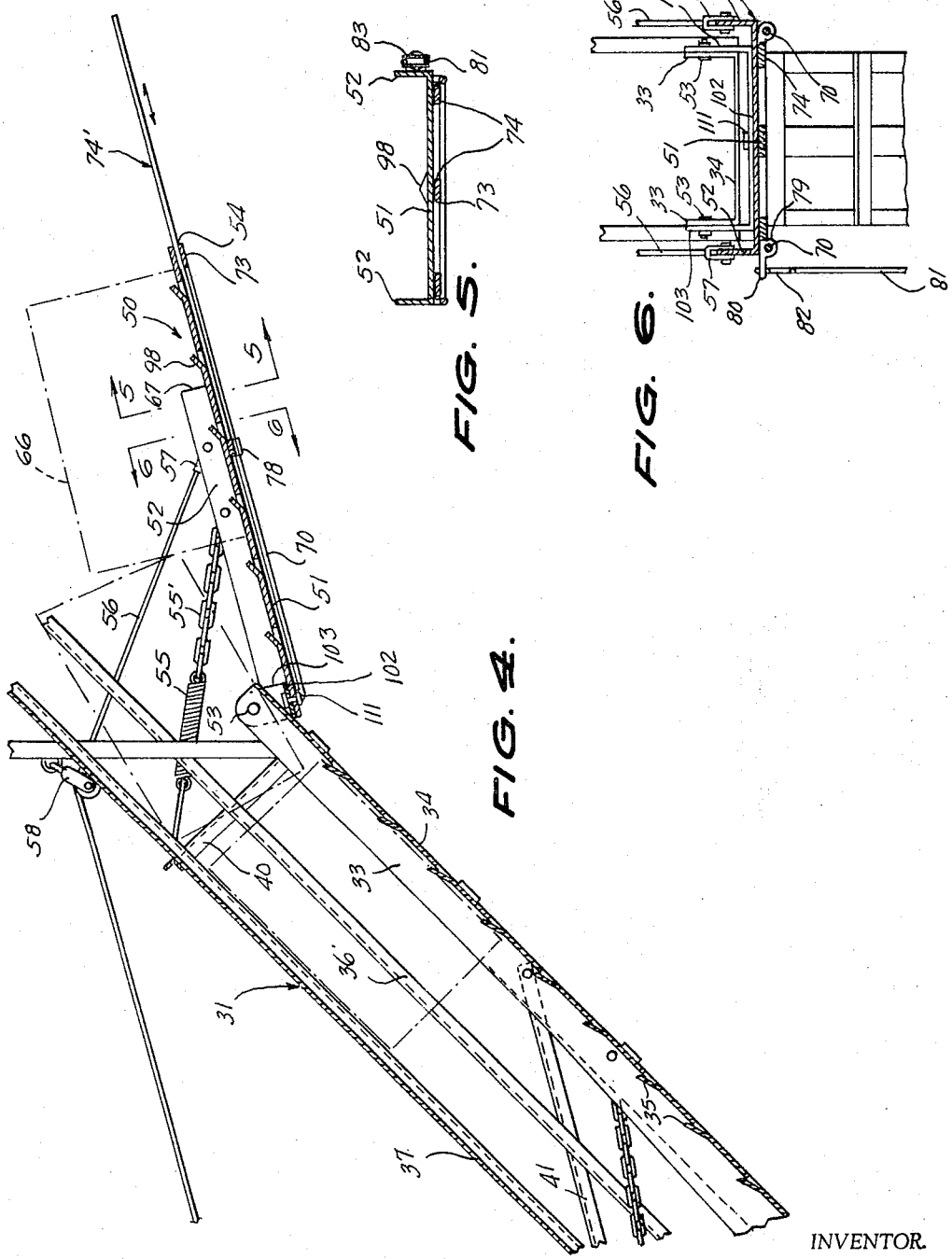

United States Patent Office 3,303,948
Patented Feb. 14, 1967

3,303,948
HAY BALE LOADER
Henry C. Peruski, Ubly, Mich. 48475
Filed June 4, 1965, Ser. No. 461,454
10 Claims. (Cl. 214—42)

This invention relates to agricultural equipment, and more particularly to hay baling machines and unloading attachments for such machines.

A main object of the invention is to provide a novel and improved bale unloading attachment for a hay baler, said attachment being relatively simple in construction, being easy to install, and providing a means for elevating bales from the baler and efficiently distributing the bales in an accompanying receiving vehicle.

A further object of the invention is to provide an improved unloading attachment for a hay baler, said attachment involving relatively inexpensive parts, being durable in construction, and being arranged so that bales from the baler will be efficiently distributed in an accompanying receiving vehicle and will be deposited in the vehicle even when the machine is moving in a sharply curved path.

A still further object of the invention is to provide an improved bale loading attachment for a hay baling machine, the attachment being provided with a discharge platform adapted to be positioned over an associated bale receiving vehicle, and means being provided for at times extending a portion of the discharge platform for the purpose of providing more efficient distribution of the unloaded bales in the receiving vehicle, whereby said vehicle is more efficiently utilized than has been possible with past equipment.

Further objects and advantages of the invention will become apparent from the following description and claims, and from the accompanying drawings, wherein:

FIGURE 1 is a fragmentary side elevational view of the forward discharge portion of a conventional hay baler provided with an improved elevating and unloading attachment constructed in accordance with the present invention.

FIGURE 1a is a fragmentary side elevational view showing a portion of the baler discharge chute on which is mounted the control means for the extensible portion of the bale discharge platform employed in the attachment illustrated in FIGURE 1.

FIGURE 2 is a top plan view of the bale unloading structure shown in FIGURE 1.

FIGURE 3 is a bottom view of the forward portion of the unloading attachment shown in FIGURE 2 with the platform extension in a forwardly adjusted position.

FIGURE 4 is an enlarged longitudinal vertical cross-sectional view taken substantially on the line 4—4 of FIGURE 2.

FIGURE 5 is a transverse cross-sectional view taken substantially on the line 5—5 of FIGURE 4.

FIGURE 6 is a transverse cross-sectional view taken substantially on the line 6—6 of FIGURE 4.

FIGURE 7 is a fragmentary perspective view showing a portion of the bottom panel of the inclined bale-guiding enclosure employed in the bale-loading attachment of FIGURES 1 to 6.

Referring to the drawings, 11 generally designates an improved bale-loading attachment according to the present invention. The attachment 11 is employed in combination with a conventional hay baler 12 provided with a bale-discharge chute 13 and in conjunction with a suitable receiving vehicle, shown in dotted view in FIGURE 1 at 14. The vehicle 14 may be a conventional farm wagon, or any other suitable wheeled vehicle. Thus, the wagon 14 shown in FIGURE 1 is provided with a hitch tongue 15 which is connected to the forward end of the baler discharge chute 13 by suitable hitch means, for example, by a hitching frame 16 which is hingedly-connected at 17 to the bottom of the chute 13 and which is supported in a U-shaped sling or yoke 18 secured to the lower portions of the opposite sidewalls of the chute 13 and extending beneath the frame 16, as illustrated in FIGURE 1, so as to support the frame in a limiting lowered position relative to chute 13.

The forward end of the hitching frame 16 is pivotally-connected to the end of tongue 15 by conventional hitch bracket means including a vertical hitch pin 19, as shown in FIGURE 1, whereby the vehicle 14 may angle relative to the baler discharge chute 13 around the vertical axis defined by hitch pin 19. Downward movement of the hitch frame 16 is limited by the U-shaped supporting yoke 18.

Designated generally at 26 is an upwardly and forwardly-inclined guide ramp which is connected to the outlet end of the baler discharge chute 13 in a position to guide and elevate bales being discharged from the chute 13 to a position overlying the wagon 14, as will be presently described.

Thus, the forwardly and upwardly-inclined guide ramp structure 26 includes a receiving portion 27 which has a generally U-shaped bottom wall having upstanding longitudinal side flanges 28 which are pivotally-connected at 29 to the lower opposite side portions of the forward end of the discharge chute 13. The member 27 is supported by side chains 30 connecting the forward portions of the flanges 28 to the upper end portions of the sidewalls of chute 13.

Connected to the forward end of the bale-receiving section 27 is a further upwardly and forwardly-inclined guide ramp portion comprising a frame-like enclosure 31 shaped to closely receive hay bales discharged from chute 13 after said bales have passed onto and have been pushed forwardly from the receiving ramp portion 27. The upwardly and forwardly-inclined frame-like enclosure 31 comprises a bottom panel 32 consisting of generally angle-shaped side bars 33, 33 and a longitudinal central bar 34 integrally-formed with spaced pairs of upstanding forwardly-projecting pointed lugs 35, 35 which serve as means to prevent return movement of bales pushed forwardly and upwardly through the enclosure 31. The frame-like enclosure 31 is also provided with side bars 36 in the side panels thereof and with a top panel including a central longitudinal bar member 37. The respective longitudinal elements of the frame-like enclosure 31 are suitably rigidly connected together by cross members, such as the bottom cross bars 38, the top cross bars 39 and the upstanding side bars 40. The inclined guide ramp structure 26 is further supported by a tie bar 41 connecting the intermediate portion of the upstanding flange on one of the side bars 33 with the frame of the baler 12. Further support for the ramp 26 is provided by the chains 30 which have top portions 42 connected at 43 to the intermediate portions of the upstanding flanges of angle bars 33. Thus, the chains 30 extend around suitable abutment lugs 44 provided at the upper forward corners of the side walls of the baler discharge chute 13.

Additional support for ramp 26 is provided on the side opposite the tie bar 41 by a supporting cable 45 connected at 46 to the upper portion of one of the angle bars 33 and connected at its opposite end to an adjustable screw eye member 47 threadedly engaged in an upstanding anchor bar 48 secured to the adjacent side wall of baler chute 13 and provided with suitable lock nut means for locking the screw 47 in adjusted position, whereby to provide a desired amount of tension in the cable 45.

Obviously, any desired means may be employed for supporting the ramp structure 26 in its forwardly and upwardly inclined position, instead of employing the various elements above described, such as the chains 30, the bar 41 and the cable 45.

Designated generally at 50 is a discharge platform which is pivotally-connected at the intermediate portion of its rear margin, as shown at 111, to the mid-portion of a transversely-extending U-shaped bracket member 102. Member 102 is provided with the upstanding legs 103, 103 which receive the forward end of bottom panel 32 between them and which are pivotally-connected at 53, 53 to the forward end portions of the vertical flanges of side bars 33, 33. The horizontal pivot connections 53, 53 define a horizontal hinge connection between discharge platform 50 and guide ramp 26, and the vertical pivot connection 111 defines a vertical hinge connection between these members, allowing the platform 50 to swing laterally, as required.

Platform 50 is located in a position to receive bales emerging from the top end of the guide ramp, said platform comprising a plate-like bottom wall 51 provided with upstanding longitudinal side flanges 52, 52 which terminate a substantial distance short of the forward end edge 54 of bottom wall member 51 for a purpose presently to be described. The vertical pivot connection 111 is made at the intermediate portion of the rear margin of bottom wall 51.

Platform 50 is resiliently-supported by coiled springs 55 and chains 55' connecting the respective flanges 52 with the opposite ends of the lengthened forward top crossbar 39' of guide ramp 26, as well as by cables 56. The cables 56 are connected at their forward ends to the flanges 52, forwardly of the chains 55', by respective yokes 57. The cables 56 extend over guide pulleys 58 swivelly-mounted on the side portions of the top end of the enclosure 31, the rear ends of the cables being connected to the ends of the legs of an A-shaped frame member 59 whose apex portion is connected by a coiled spring 60 and an adjustable eye bolt 61 to the top end of an upstanding post member 62 secured to the frame of the baler 12. An additional coiled spring 63 has one end thereof connected by an eye bolt 64 to the post 62 and the other end thereof connected by a chain 65 to the rear fixed portion of the bracket 59, serving as an auxiliary reinforcing spring to assist the spring 60 after said spring 60 has been placed under a predetermined amount of tension. Thus, the springs associated with the cables 56 and the spring 55 serve to resiliently-support the discharge platform 50 so that it is normally in an upwardly and forwardly-inclined position, as shown in FIGURE 1. However, when a bale of hay moves onto the platform 50, for example, as shown in dotted view in FIGURE 4, wherein the foremost bale 66 has been pushed onto the forward end portion of platform 50, the weight of the bale overcomes the force of the springs 55, 60 and, eventually, 63, and the platform 50 is thus forced downwardly toward a substantially horizontal position to allow the bale 66 to be pushed off the platform into the receiving vehicle 14. Thus, under normal operating conditions the bales 66 are forced successively out of the chute 13, onto the receiving portion 27 of the loader 11, from thence upwardly and forwardly through the guide enclosure 26, being pushed forwardly from the top of the enclosure 26 onto the platform 50, and finally being advanced sufficiently forwardly so that the weight of the foremost bale overcomes the spring force supporting the platform, causing the platform to tilt downwardly to said horizontal position to allow discharge of the foremost bale in the subjacent receiving vehicle 14.

As previously mentioned, the upstanding side flanges 52 of the platform terminate a substantial distance short of the front edge 54 of the platform, for example, as shown at 67 in FIGURE 4, so that if the baler is turning, and there is a substantial angle between the longitudinal axis of the baler and the longitudinal axis of the receiving vehicle 14, the endmost bale 66 may still be deposited in the receiving vehicle 14, since it can be pushed laterally off the forward end portion of platform 50 and thereby can be delivered into the receiving vehicle. The forward edges 67 of the flanges 52 are spaced a sufficient distance rearwardly from the forward edge 54 of platform 50 to allow the foremost bale 66 to be deviated laterally so that it can be pushed off the side margin of the platform, if required.

In order to permit more efficient loading of the receiving vehicle 14, namely, in order to, at times, allow the bales to be deposited in the forward portion of the receiving vehicle, a sliding extension is provided for the platform 50 to allow the bale 66 to travel forwardly a further distance than normally before being deposited in the wagon 14. Thus, the platform 50 is provided beneath its opposite side margins with longitudinally-extending supporting rods 70, 70, said rods having offset fastening eyes 71 at their rear ends whereby they are secured to the rear end portions of the opposite side margins of the bottom wall 51 of platform 50 by means of fastening bolts 72. The front end of the wall element 51 is provided with a transversely-extending depending bracket bar 73. Designated generally at 74' is an auxiliary supporting frame comprising longitudinally-extending spaced parallel bar elements 74 connected at their rear portions by the transverse crossbar 75 and by auxiliary crossbars 76, 76 spaced forwardly from the end crossbar 75, as shown in FIGURE 3. The bar members 74 are slidably supported on the transverse supporting bracket 73, and the end crossbar 75 is provided at its opposite ends with the respecitve sleeves 78 and 79 which slidably receive the longitudinal rods 70, whereby the frame 74' is guided longitudinally relative to and subjacent the main wall 51 of platform 50.

One end of the crossbar 75 adjacent to the sleeve element 79 thereof is provided with an apertured lug 80 to which are connected respective cables 81 and 82, the cable 81 extending forwardly and around a pulley 83 mounted on the forward portion of the adjacent side edge of platform 50 and then rearwardly through a guide loop 84 provided on the rear portion of said side edge. The other cable 82 extends rearwardly through the guide loop 84, and both of the cables 81 and 82 extend rearwardly through a guide loop 87 provided on the top end of an upstanding post 88 secured to the side portion of the baler chute 13 and thence, extend toward an operating wheel 89, being secured to diametrically-opposite portions of said wheel, as shown in FIGURE 1a. The wheel 89 is rotatably mounted on an upstanding supporting post 90 mounted on the baler at a location conveniently near the operator's seat, said wheel being provided with an operating crank 91. The crank 91 is normally engaged with a latch element 92 provided on the post 90, so that the wheel 89 is locked. However, when it is desired to extend the frame 74' so as to lengthen the discharge platform of the loader, the handle 91 is disengaged from its latch 92 and is rotated counterclockwise through an angle of approximately 180° so that it can be lockingly engaged with another latch element 94 provided on post 90 below the axis of the bearing which supports the wheel 89. When the wheel 89 is rotated counterclockwise, as above-described, the cable 81 pulls the platform extension frame 74' forwardly from its normal retracted position to a position wherein it projects a substantial distance forwardly of the front edge 54 of the platform and thereby forms the desired forward extension thereof. The frame 74' may be locked in its forwardly extended position by engaging the handle 91 with the lower locking element 94, as above described. To retract the frame 74', the handle 91 is disengaged from the latch 94 and is rotated in a clockwise direction, as viewed in FIGURE 1a, toward the position shown in full line view therein so that it is engageable with the latch 92. This develops the required tension in the cable 82 to pull the frame 74' back to its normal retracted position. As above mentioned, frame 74' is extended when it is desired to deliver bales to the forward portion of the receiving vehicle 14, whereby the vehicle may be more efficiently loaded.

The main supporting wall 51 of the platform 50 is provided along its longitudinal center line with a plurality of spaced upwardly and forwardly projecting pointed lugs 98 which serve, in the same manner as the previously described pointed lugs 35 to retard or prevent rearward sliding movement of the bales on platform 50.

The loader 11 is braced laterally relative to the baler 12 by the strut bar 41 which, as shown in FIGURE 2, is inclined laterally and rearwardly from its connection with the bottom longitudinal bar of the inclined elevating enclosure 26 and is connected at 99 to the outwardly projecting frame bar 100, forming part of the baler frame. The frame bar 100 is further braced by an auxiliary diagonal frame bar 101 connecting the bar 100 to the baler frame.

As will be seen from FIGURE 7, the bottom panel of the guide enclosure 26 is of relatively open construction, providing relatively free access to the bales as they are being moved up through the guide enclosure 26, so that if necessary, the bales may be tied or further secured by wire or other fastening means while they are in the guide enclosure 26 and before they are pushed upwardly toward the discharge platform 50.

While a specific embodiment of an improved loading attachment for a hay baler has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a hay baler having a bale discharge chute, means to connect a receiving vehicle to said chute forwardly of the outlet thereof, an upwardly and forwardly-inclined guide ramp connected to the outlet end of the chute and being provided with enclosure means to guide bales therealong as they are pushed out from said outlet end of the chute, a discharge platform hinged to the top end of said guide ramp and located to overlie the body of a receiving vehicle connected to the chute, an auxiliary supporting frame longitudinally slidably engaged with said platform and being longitudinally extensible forwardly of said platform, and resilient supporting means connecting said discharge platform to the baler and being yieldable under the weight of a bale to allow the bale to be discharged forwardly off said discharge platform.

2. In combination, a hay baler having a bale discharge chute, means to connect a receiving vehicle to said chute forwardly of the outlet thereof, an upwardly and forwardly-inclined guide ramp connected to the outlet end of the chute and being provided with enclosure means to guide bales therealong as they are pushed out from said outlet end of the chute, a discharge platform hinged to the top end of said guide ramp and located to overlie the body of a receiving vehicle connected to the chute, an auxiliary supporting frame longitudinally slidably engaged with said platform and being longitudinally extensible forwardly of said platform, cable means supportingly-connected to said discharge platform, and spring means connecting said cable means to the baler and being yieldable under the weight of a bale to allow the bale to be discharged forwardly off said discharge platform.

3. In combination, a hay baler having a bale discharge chute, means to connect a receiving vehicle to said chute forwardly of the outlet thereof, an upwardly and forwardly-inclined guide ramp hingedly connected to the outlet end of the chute and being provided with enclosure means to guide bales therealong as they are pushed out from said outlet end of the chute, flexible supporting means connecting said guide ramp to the baler to hold the ramp in an upwardly and forwardly-inclined position, a discharge platform hinged to the top end of said guide ramp and located to overlie the body of a receiving vehicle connected to the chute, an auxiliary supporting frame longitudinally slidably engaged with said platform and being longitudinally extensible forwardly of said platform, and resilient supporting means connecting said discharge platform to the baler and being yieldable under the weight of a bale to allow the bale to be discharged forwardly off said discharge platform.

4. In combination, a hay baler having a bale discharge chute, means to connect a receiving vehicle to said chute forwardly of the outlet thereof, an upwardly and forwardly-inclined guide ramp hingedly connected to the outlet end of the chute and being provided with enclosure means to guide bales therealong as they are pushed out from said outlet end of the chute, flexible supporting means connecting said guide ramp to the baler to hold the ramp in an upwardly and forwardly-inclined position, a discharge platform hinged to the top end of said guide ramp and located to overlie the body of a receiving vehicle connected to the chute, an auxiliary supporting frame longitudinally slidably engaged with said platform and being longitudinally extensible forwardly of said platform, cable means supportingly connected to said discharge platform, and spring means connecting said cable means to the baler and being yieldable under the weight of a bale to allow the bale to be discharged forwardly off said discharge platform.

5. In combination, a hay baler having a bale discharge chute, means to connect a receiving vehicle to said chute forwardly of the outlet thereof, an upwardly and forwardly-inclined guide ramp connected to the outlet end of the chute and being provided with enclosure means to guide bales therealong as they are pushed out from said outlet end of the chute, a discharge platform hinged to the top end of said guide ramp and located to overlie the body of a receiving vehicle connected to the chute, transversely-extending supporting bracket means on the bottom of said discharge platform, an auxiliary supporting frame slidably engaged on said bracket means and being longitudinally-extensible forwardly of said platform, and resilient supporting means connecting said discharge platform to the baler and being yieldable under the weight of a bale to allow the bale to be discharged forwardly off said discharge platform.

6. In combination, a hay baler having a bale discharge chute, means to connect a receiving vehicle to said chute forwardly of the outlet thereof, an upwardly and forwardly-inclined guide ramp connected to the outlet end of the chute and being provided with enclosure means to guide bales therealong as they are pushed out from said outlet end of the chute, a discharge platform hinged to the top end of said guide ramp and located to overlie the body of a receiving vehicle connected to the chute, transversely-extending supporting bracket means on the bottom of said discharge platform, an auxiliary supporting frame slidably engaged on said bracket means and being longitudinally-extensible forwardly of said platform, means for extending and retracting said auxiliary frame, and resilient supporting means connecting said discharge platform to the baler and being yieldable under the weight of a bale to allow the bale to be discharged forwardly of said discharge platform.

7. In combination, a hay baler having a bale discharge chute, means to connect a receiving vehicle to said chute forwardly of the outlet thereof, an upwardly and forwardly-inclined guide ramp connected to the outlet end of the chute and being provided with enclosure means to guide bales therealong as they are pushed out from said outlet end of the chute, a discharged platform hinged to the top end of said guide ramp and located to overlie the body of a receiving vehicle connected to the chute, transversely-extending supporting bracket means on the bottom of said discharge platform, an auxiliary supporting frame slidably engaged on said bracket means and being longitudinally-extensible forwardly of said platform, a rotary operating member mounted on the baler, cable means connected to opposite portions of said operating member, pulley means on the discharge platform, said cable means extending around said pulley means, means connecting said cable means to said auxiliary platform rearwardly of said pulley means for extending and retracting said auxiliary frame responsive to rotation of said operating member in opposite directions, and resilient supporting means connecting said discharge platform to the baler and being yieldable under the weight of a bale to allow the bale to be discharged forwardly off said discharge platform.

8. In combination, a hay baler having a bale discharge chute, means to connect a receiving vehicle to said chute forwardly of the outlet thereof, an upwardly and forwardly-inclined guide ramp hingedly connected to the outlet end of the chute and being provided with enclosure means to guide bales therealong as they are pushed out from said outlet end of the chute, flexible supporting means connecting said guide ramp to the baler to hold the ramp in an upwardly and forwardly-inclined position, a discharge platform hinged to the top end of said guide ramp and located to overlie the body of a receiving vehicle connected to the chute, transversely-extending supporting bracket means on the bottom of said discharge platform, an auxiliary supporting frame slidably engaged on said bracket means and being longitudinally-extensible forwardly of said platform, a rotary operating member mounted on the baler, cable means connected to opposite portions of said operating member, pulley means on the discharge platform, said cable means extending around said pulley means, means connecting said cable means to said auxiliary platform rearwardly of said pulley means for extending and retracting said auxiliary frame responsive to rotation of said operating member in opposite directions, further cable means supportingly connected to said discharge platform, and spring means connecting said further cable means to the baler and being yieldable under the weight of a bale to allow the bale to be discharged forwardly off said discharge platform.

9. In combination, a hay baler having a bale discharge chute, means to connect a receiving vehicle to said chute forwardly of the outlet thereof, an upwardly and forwardly-inclined guide ramp connected to the outlet end of the chute and being provided with enclosure means to guide bales therealong as they are pushed out from said outlet end of the chute, a discharge platform hinged to the top end of said guide ramp and located to overlie the body of a receiving vehicle connected to the chute, an auxiliary supporting frame longitudinally slidably engaged with said platform and being longitudinally extensible forwardly of said platform, and resilient supporting means connecting said discharge platform to the baler and being yieldable under the weight of a bale to allow the bale to be discharged forwardly off said discharge platform, said discharge platform being provided with upstanding longitudinal marginal guide flange elements to guide a bale longitudinally therealong, said flange elements terminating a substantial distance short of the forward end of the discharge platform to at times allow a bale to be discharged laterally off the end portion of the platform.

10. In combination, a hay baler having a bale discharge chute, means to connect a receiving vehicle to said chute forwardly of the outlet thereof, an upwardly and forwardly-inclined guide ramp connected to the outlet and of the chute and being provided with enclosure means to guide bales therealong as they are pushed out from said outlet end of the chute, a discharge platform hinged to the top end of said guide ramp and located to overlie the body of a receiving vehicle connected to the chute, an auxiliary supporting frame longitudinally slidably engaged with said platform and being longitudinally extensible forwardly of said platform, upwardly and forwardly-projecting longitudinally-spaced pointed lugs on the bottom wall of the ramp and on the platform to prevent return movement of bales thereon, and resilient supporting means connecting said discharge platform to the baler and being yieldable under the weight of a bale to allow the bale to be discharged forwardly off said discharge platform.

References Cited by the Examiner

UNITED STATES PATENTS

| | | | |
|---|---|---|---|
| 1,108,599 | 8/1914 | McCullough | 198—225 |
| 1,447,196 | 3/1923 | Williams | 56—473.5 |
| 2,625,002 | 1/1953 | Prechel | 56—47 |
| 2,845,770 | 8/1958 | Fessler | 56—473.5 |

GERALD M. FORLENZA, *Primary Examiner.*

ROBERT G. SHERIDAN, *Examiner.*